(12) United States Patent
Olstad et al.

(10) Patent No.: US 11,188,522 B2
(45) Date of Patent: Nov. 30, 2021

(54) STREAMLINED DATABASE COMMIT FOR SYNCHRONIZED NODES

(71) Applicant: International Business Machines Corporation, Armonk, NY (US)

(72) Inventors: Chad A. Olstad, Rochester, MN (US); Donald F. Zimmerman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 16/446,034

(22) Filed: Jun. 19, 2019

(65) Prior Publication Data

US 2020/0401575 A1 Dec. 24, 2020

(51) Int. Cl.
*G06F 16/00* (2019.01)
*G06F 16/23* (2019.01)

(52) U.S. Cl.
CPC ...... *G06F 16/2379* (2019.01); *G06F 16/2343* (2019.01)

(58) Field of Classification Search
None
See application file for complete search history.

(56) References Cited

U.S. PATENT DOCUMENTS

| | | | |
|---|---|---|---|
| 8,880,486 B2 | 11/2014 | Driesen et al. | |
| 9,959,308 B1* | 5/2018 | Carman | G06F 16/2365 |
| 10,235,440 B2 | 3/2019 | Lee et al. | |
| 2009/0313311 A1* | 12/2009 | Hoffmann | G06F 11/2097 |
| 2012/0030184 A1* | 2/2012 | Driesen | G06F 16/2379 |
| | | | 707/703 |
| 2013/0297580 A1* | 11/2013 | Markus | G06F 16/2343 |
| | | | 707/703 |
| 2018/0276028 A1 | 9/2018 | Gokavarapu et al. | |

FOREIGN PATENT DOCUMENTS

| | | |
|---|---|---|
| CN | 106445644 A | 2/2017 |
| WO | 2017135978 A1 | 8/2017 |

\* cited by examiner

*Primary Examiner* — Bai D Vu
(74) *Attorney, Agent, or Firm* — Patterson + Sheridan, LLP

(57) ABSTRACT

Techniques for streamlined commit procedures between synchronized nodes are provided. A request to commit a transaction is transmitted from a first node, where the request instructs a second node to retain any locks related to the transaction. A response is received, from the second node, indicating that the transaction was successfully committed. Upon receiving the response, the transaction is committed on the first node. Upon successfully committing the transaction on the first node, first cleanup request is transmitted to the second node, where the cleanup request instructs the second node to release any locks related to the transaction.

20 Claims, 6 Drawing Sheets

STREAMLINED DATABASE COMMIT FOR SYNCHRONIZED NODES

BACKGROUND

The present disclosure relates to synchronized nodes, and more specifically, to streamlined commit procedures across computing nodes.

Computing nodes can be used to process workloads and transactions for any number of applications and users. In many environments, multiple computing nodes are maintained as discrete computing environments to distribute application workload(s). In some systems, to provide faster recoveries and safeguard data, a computing node can be cloned or otherwise synchronized with one or more other nodes. If one node fails, the other can then be used to continue normal operations. Typically, to ensure the data remains in sync, existing systems require that the computing nodes utilize a two-phase commit process for changes being committed to disk. This helps prevents data inconsistencies in the event of a system or communications failure during the commit, but introduces several extra inter-node transmissions, as well as additional computing overhead.

SUMMARY

According to one embodiment of the present disclosure, a method is provided. The method includes transmitting, from a first node, a first request to commit a first transaction, wherein the first request instructs a second node to retain any locks related to the first transaction. The method further includes receiving, from the second node, a first response indicating that the first transaction was successfully committed. Upon receiving the first response, the method includes committing the first transaction on the first node. Additionally, upon successfully committing the first transaction on the first node, the method includes transmitting a first cleanup request to the second node, wherein the first cleanup request instructs the second node to release any locks related to the first transaction.

According to a second embodiment of the present disclosure, a computer-readable storage medium is provided. The computer-readable storage medium has computer-readable program code embodied therewith, the computer-readable program code executable by one or more computer processors to perform an operation. The operation includes transmitting, from a first node, a first request to commit a first transaction, wherein the first request instructs a second node to retain any locks related to the first transaction. The operation further includes receiving, from the second node, a first response indicating that the first transaction was successfully committed. Upon receiving the first response, the operation includes committing the first transaction on the first node. Additionally, upon successfully committing the first transaction on the first node, the operation includes transmitting a first cleanup request to the second node, wherein the first cleanup request instructs the second node to release any locks related to the first transaction.

According to a third embodiment of the present disclosure, a system is provided. The system includes one or more computer processors, and a memory containing a program which when executed by the one or more computer processors performs an operation. The operation includes transmitting, from a first node, a first request to commit a first transaction, wherein the first request instructs a second node to retain any locks related to the first transaction. The operation further includes receiving, from the second node, a first response indicating that the first transaction was successfully committed. Upon receiving the first response, the operation includes committing the first transaction on the first node. Additionally, upon successfully committing the first transaction on the first node, the operation includes transmitting a first cleanup request to the second node, wherein the first cleanup request instructs the second node to release any locks related to the first transaction.

DETAILED DESCRIPTION

Figure 1:
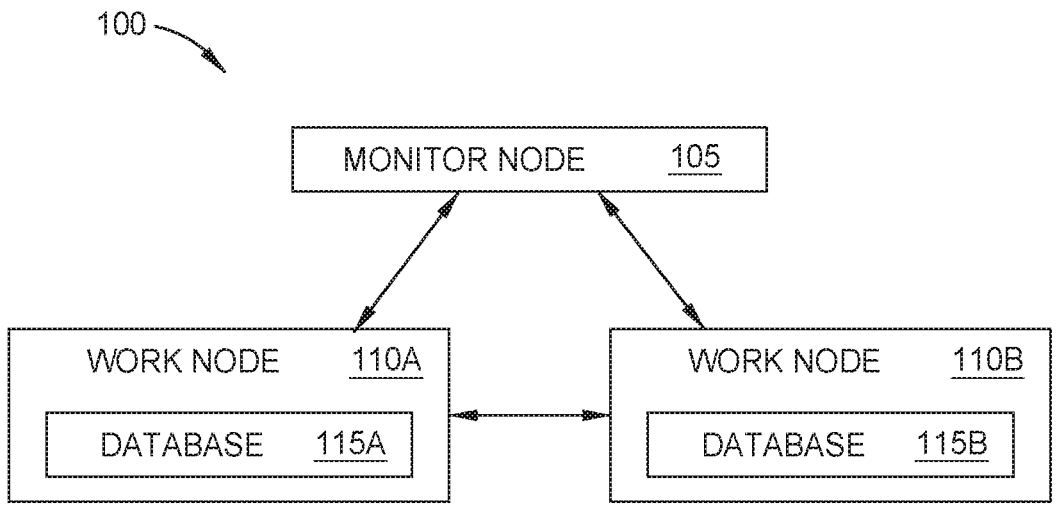
FIG. 1 illustrates a system configured to implement streamlined synchronization between computing nodes, according to one embodiment disclosed herein.

In embodiments of the present disclosure, a system architecture provides methods to mirror data between two or more computing nodes, in order to keep database files or other objects synchronized. Embodiments of the present disclosure provide techniques to streamline this commit process between synchronized computing nodes. In existing systems, a traditional two-phase commit process is utilized. In embodiments, the streamlined procedure described in the present disclosure reduces the number of operations that must occur, and further reduces the number of transmissions that must be passed between the nodes. This can reduce the computing overhead (in terms of resources and latency) imposed by the procedure, which improves the efficiency and operations of the architecture.

In an existing two-phase commit process, the originating node (also referred to as a source node) initiates the commit process for a given Logical Unit of Work ("LUW", also referred to as a workload or a transaction) by first transitioning the LUW to "prepare in progress" state, where the source node confirms that the commit can be accomplished. This involves validating that it will not result in conflicting or duplicate keys in the database, as well as enforcing other constraints like referential integrity. After completing this preparation, the source node must transmit, to the target node, a request to perform this same preparation on its copy of the data. In traditional systems, the source node must await a response from the target node before proceeding.

In a traditional two-phase process, when the source node receives a response indicating that the preparation was completed successfully by the target node, the source node then moves the LUW state to a "commit in progress" state, and finalizes committing the relevant changes to its database. The source node then must ask the target node to do the same. Further, the source node then must await a successful confirmation from the target node, before resetting the LUW state and continuing normal operations. This process requires several disk writes, as each change in the LUW state requires a write-to-disk, and further requires delay and extra communications be sent over the connection between the nodes. Embodiments of the present disclosure utilize a tracking system to streamline the commit process.

In full two-phase commit procedures, all involved nodes must either commit or rollback all changes. That is, either all nodes commit the changes, or all nodes rollback the changes. In a two-phase commit, it is impermissible to have one node commit while another does not. Thus, in existing systems, if any node fails to complete the commit process (or if communication is lost), all nodes must roll back all changes. Some embodiments of the present disclosure, using mirror tracking, enable one node to commit the changes while others roll them back. Further, in some embodiments, the LUW state need not be changed, reducing the computing overhead required to complete the synchronization.

In some embodiments of the present disclosure, the streamlined commit procedures can be utilized if the commit involves only record-level changes in the database, while the traditional two-phase commit process is used for more complicated changes. For example, in such an embodiment, updating a value or balance of a record (or adding or deleting a row or record) can use the streamlined process, while adding or deleting an entire table (or a column in a table) may require the full two-phase process. In one embodiment, the streamlined procedures begin with the source node performing similar preparation and validation procedures. However, in embodiments, the source node need not (and does not) change the LUW state into preparation, and the LUW remains in its previous state.

In an embodiment, once the validation is complete, the source node can transmit a new type of message instructing the target node to perform both preparation and commit, without awaiting further instruction. In one embodiment, this transmission further instructs the target node to retain any locks that are needed for the changes, such that the records cannot be further changed until the locks are released. For example, if the commit involves updating a user's account balance, the target node can retain a lock on that data, in order to prevent other operations from changing the balance until the lock is released. In some embodiments, once the commit is completed by the target node, the target returns a response to the source. The source node can then similarly complete its commit process, releasing all of its local locks after the commit is completed. After this, in one embodiment, the source node then transmits an instruction to the target node to clean up the changes and release the relevant locks on the target database. No further communications between the nodes are required.

Embodiments of the present disclosure can thereby reduce the number of inter-node communications, as well as reducing the number of disk writes required, in a manner that streamlines the commit process while maintaining data integrity. In embodiments, the manner in which each node responds to failure at any stage can depend on a variety of factors, including whether the node is the source or target, whether the node is a primary or secondary node, whether the failure involves a system outage or merely communications failures, and the like. Notably, in some embodiments, if one node fails, the remaining node(s) may complete the commit process while tracking the involved changes. The other node(s) can then use this tracking data to resynchronize the commit once communication is reestablished.

In an embodiment, if the failure terminates communications or the target node fails (such that the source node remains), the source node can respond in a number of ways. In one embodiment, if the source node is the primary node (or becomes the primary node after the failure, as discussed in more detail below), the source node will track the changes, and continue forward as normal (committing the changes locally, and releasing the related locks). In contrast, if the source node is a secondary node, the node will roll back any changes that have not yet been committed. Notably, in some embodiments, if a failure is detected, the source node will not yet have committed any changes. That is, in some embodiments, failure, from the perspective of the source node, is only possible prior to the source node committing changes. Thus, in such an embodiment, if the source node has already committed the changes, the commit process is considered complete from the perspective of the source node, and nothing need be done.

In an embodiment, if the failure terminates communications or the source node fails (such that the target node remains), the target node can similarly respond in a number of ways. In one embodiment, if the target node is the primary node (or becomes the primary node after the failure, as discussed in more detail below), the target node will track the changes, and continue forward as normal (committing the changes locally if they have not already been committed, and releasing the related locks). In contrast, if the target node is a secondary node, the node will unlock the records, and continue as normal. Note that in some embodiments, if a failure is detected, the target node will already have committed any changes. That is, in some embodiments, failure of the procedure is only possible, from the perspective of the target node, after the target node has committed the changes. In such an embodiment, the target node therefore simply releases the locks and proceeds as normal.

FIG. 1 illustrates a System 100 configured to implement streamlined synchronization between computing nodes, according to one embodiment disclosed herein. In the illustrated embodiment, two Work Nodes 110A and 110B are communicatively linked and configured to mirror data between them, such that their respective Databases 115A and 115B remain synchronized. In one embodiment, if either Work Node 110A or 110B commits changes to its respective Database 115A and 115B, the initiating Work Node 110A-B begins either a traditional two-phase commit process, or a streamlined commit process described in the present disclosure, in order to ensure the changes are reflected on each Work Node 110A-B. Although two Work Nodes 110A-B are illustrated, in embodiments, there may be any number of nodes in the System 100.

In the illustrated embodiment, a Monitor Node 105 monitors each Work Node 110A-B. In one embodiment, the Monitor Node 105 periodically or on command determines the status of each Work Node 110 (e.g., online, offline, non-responsive, in startup, and the like). In some embodiments, the Monitor Node 105 also monitors whether communication is possible between the Work Nodes 110 (e.g., whether or not the network or communication link between Work Nodes 110A-B is online). In one embodiment, if the communications link is offline, the Monitor Node 105 informs the affected Work Nodes 110 so they can respond appropriately.

Additionally, in some embodiments, if one of the Work Nodes 110 goes offline, the Monitor Node 105 can inform the remaining node(s), and/or make changes to the configuration of the System 100, as appropriate. For example, in one embodiment, each Work Node 110 is designated as a "primary" node or a "secondary" node. In some embodiments, this designation is provided by a user. In one embodiment, there may be a number of secondary nodes for a given primary node. Further, in some embodiments, a node's status as "primary" or "secondary" is with respect to each other Work Node 110, such that a given Work Node 110 may be primary with respect to one or more nodes, but secondary with respect to one or more other nodes. In some embodiments, if a primary Work Node 110 crashes or otherwise goes offline, the Monitor Node 105 (or a user) can select a secondary node to be made primary, as discussed below in more detail.

Figure 2:
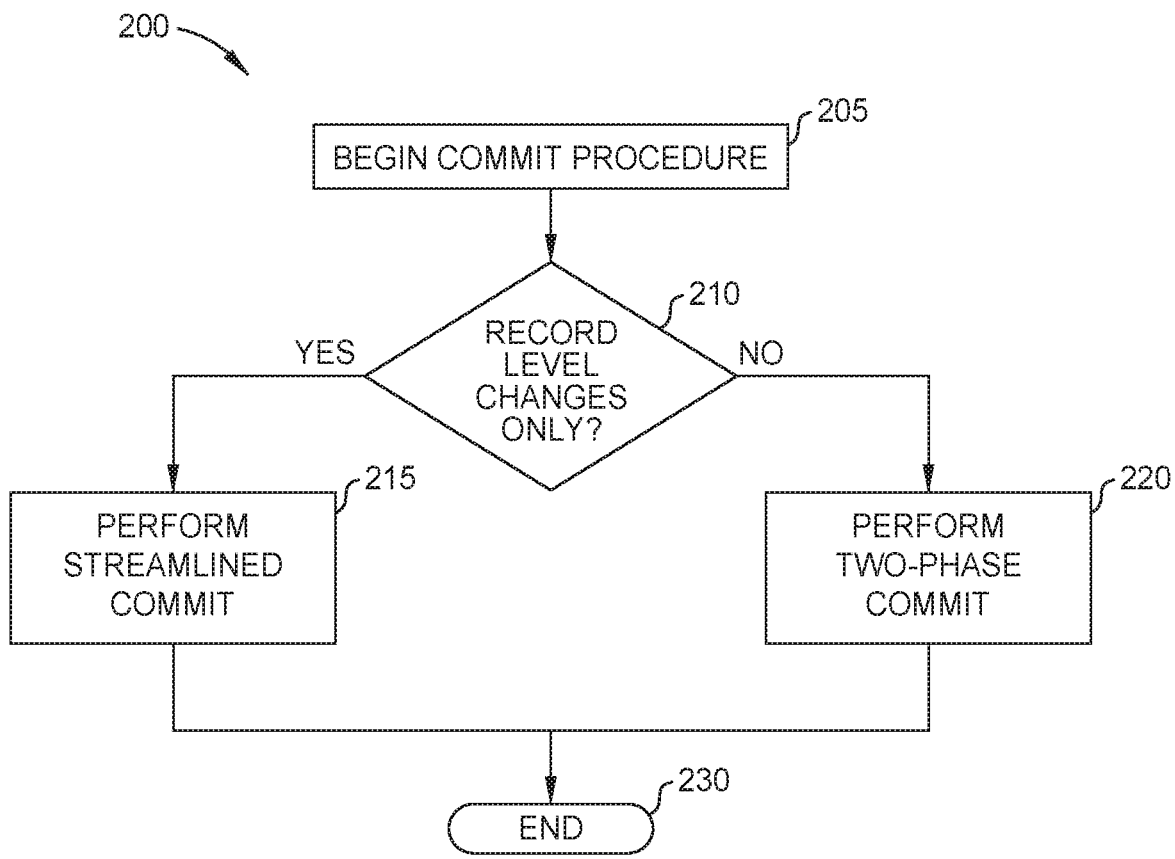
FIG. 2 is a flow diagram illustrating a method of committing changes to synchronize computing nodes, according to one embodiment disclosed herein.

FIG. 2 is a flow diagram illustrating a method 200 of committing changes to synchronize computing nodes, according to one embodiment disclosed herein. In an embodiment, the method 200 allows Work Nodes 110 to dynamically determine whether to utilize a streamlined commit process (also referred to herein as a "two-phase light" process or a "1.5-phase" process), or an ordinary two-phase process. The method 200 begins at block 205, where the originating Work Node 110 begins a commit procedure. In one embodiment, a commit procedure includes any operation that modifies the storage (e.g., a database), including modifying data in storage, adding data to storage, removing data from storage, and the like. In some embodiments, the Work Nodes 110 operate on LUWs (also referred to as transactions) in memory, and use commit procedures when the changes are ready to be committed to storage. In an embodiment, therefore, the determination to begin commit procedures is programmatic (e.g., defined by one or more applications executing the workloads). In some embodiments, other triggers can be utilized (e.g., a user instructing the node to commit changes to storage).

In the illustrated embodiment, the method 200 proceeds to block 210, where the Work Node 110 determines whether the commit involves only record-level changes, or if more complex changes are required (such as adding or deleting columns from a table, or entire tables from a database). In the illustrated embodiment, the streamlined procedures can be readily applied to record-level commits, but other changes require a full two-phase process. In one embodiment, this is due to the nature of the tracking functionality described below. In some embodiments, however, the streamlined procedures can be similarly implemented for other changes, depending on the particular implementation and tracking capabilities.

If the Work Node 110 determines that only record-level changes are involved, the method 200 proceeds to block 215, where the nodes perform a streamlined commit process, described in more detail below. In contrast, if other (more complex) changes are required, the method 200 continues to block 220 where the nodes perform the traditional two-phase commit process. Once the selected commit procedure is completed, the method 200 terminates at block 230.

Figure 3:
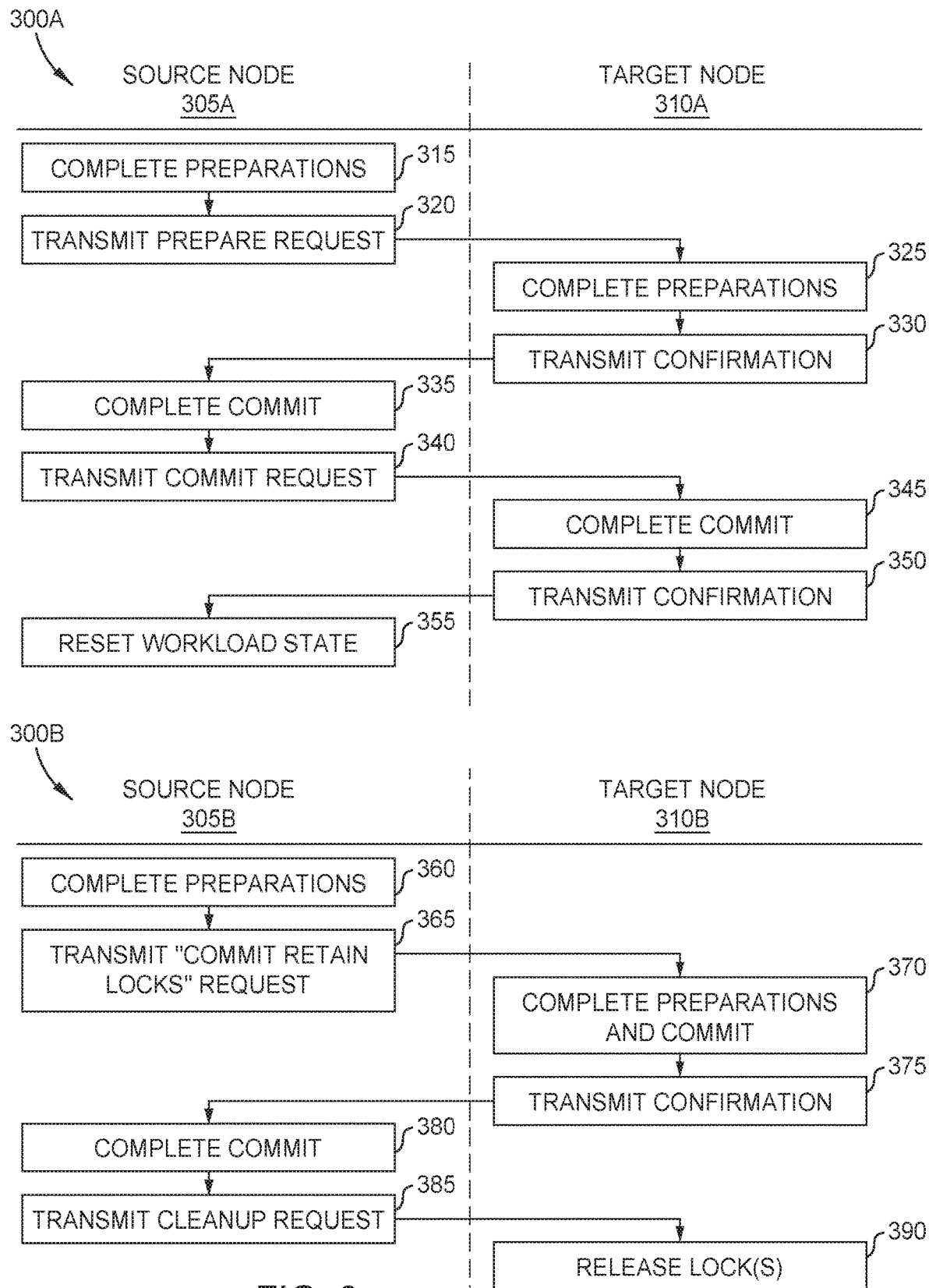
FIG. 3 illustrates two workflows for committing changes in synchronized nodes, according to one embodiment disclosed herein.

FIG. 3 illustrates two workflows 300A and 300B for committing changes in synchronized nodes, according to one embodiment disclosed herein. In the illustrated embodiment, the workflow 300A illustrates a full two-phase commit process, while the workflow 300B depicts a streamlined commit procedure that reduces communications overhead and minimizes computing resources needed to achieve synchronized commit of the changes involved. In the depicted workflows 300A-B, operations performed on the Source Node 305 are depicted to the left of the vertical dashed line, while operations performed by the Target Node 310 are depicted to the right of the dashed line. In an embodiment, the Source Node 305 is the Work Node 110 that initiated the commit process, regardless of whether the Source Node 305 is a primary or secondary node. Similarly, the Target Node 310 is the Work Node 110 that is mirroring the Source Node 305 for purposes of the current commit, regardless of whether the Target Node 310 is a primary or secondary node.

In the illustrated workflow 300A, the two-phase procedure begins at block 315, where the Source Node 305A completes any required preparations for the workload. In one embodiment, this includes forcing the LUW to a "preparation" state. In embodiments, the preparations generally include validation or other procedures needed to ensure the commit will complete successfully. This can include, for example, checking to ensure the planned commit will not result in conflicting or duplicate keys in the database, as well as enforcing other constraints like referential integrity. Once the Source Node 305A successfully validates the planned commit, the workflow 300A proceeds to block 320, where the Source Node 305A generates and transmits a request to the Target Node 310A, instructing the Target Node 310A to perform the same preparation operations.

At block 325, the Target Node 310A completes these validation/preparation procedures to prepare to commit the changes, and at block 330, the Target Node 310A returns a confirmation or response to the Source Node 305A, indicating that the preparation was successful. In response to receiving this communication, at block 335, the Source Node 305A performs the commit on the database of the Source Node 305A. That is, the Source Node 305A commits to storage (e.g., to a database) the changes indicated in the transaction/workload. At block 340, the Source Node 305A then transmits, to the Target Node 310A, an instruction or request to similarly commit the indicated changes on the database of the Target Node 310A. At block 345, the Target Node 310A does so. Further, as illustrated, the Target Node 310A then transmits a confirmation to the Source Node 305A. Finally, at block 355, the Source Node 305A resets the workload state, and continues normal operations.

Turning to the workflow 300B, a streamlined commit procedure is illustrated. The workflow 300B takes advantage of tracking capabilities discussed in more detail below. In an embodiment, if the commit is completed successfully, the tracking data is not used. However, in some embodiments, in the event of a system failure or communication failure, the tracking data is used to resync the nodes, as discussed in more detail below. The workflow 300B begins at block 360, where a Source Node 305B completes preparations for the commit. In an embodiment, this includes similar validations as discussed above. Notably, in one embodiment, the Source Node 305B may change the LUW into a "prepare" state, but does not write this change to disk.

That is, in existing two-phase procedures, the LUW state is written to disk whenever it is changed. In contrast, using the streamlined commit process, the state change is not written to disk. In existing two-phase commit procedures, if the system crashes, the system needs to know what LUW state was reached when it comes back online, in order to communicate with the other nodes and decide whether to commit or roll back the changes. Using embodiments of the streamlined commit process described herein, however, the changes are always rolled back in this case, regardless of whether LUW state is prepared or not. In embodiments, the tracking/resync process described herein can handle the rest, so writing the LUW "prepare" state to disk is not necessary.

At block 365, the Source Node 305B transmits a request to the Target Node 310B, instructing it to both prepare/validate the indicated changes, as well as commit the changes to the database. In an embodiment, the instruction also instructs the Target Node 310B to retain all locks associated with the change, even after the commit is completed. The workflow 300B then proceeds to block 370, where, in response to this request, the Target Node 310B completes the preparation process and finalizes the commit. At block 375, the Source Node 305B returns an indication of this successful commit.

In response, at block 380, the Source Node 305B similarly completes the commit on its local storage. In an embodiment, the Source Node 305B further performs cleanup operations. In an embodiment, this includes releasing any locks that were obtained for the changes. That is, in an embodiment, to commit changes, the node uses a lock for any data to be changed in the local database. The lock prevents other entities (e.g., other applications or users) from modifying the locked data until the node releases the lock. In an embodiment, once the Source Node 305B completes its commit, it releases these locks. The workflow 300B then continues to block 385, where the Source Node 305B instructs the Target Node 310B to similarly complete this cleanup. At block 390, the Target Node 310B does so by releasing the held locks.

As illustrated, the two-phase commit process requires four separate transmissions across the link between the Source Node 305A and the Target Node 310A, while the streamlined process utilizes three transmissions. Further, in an embodiment, if either node fails or of any of the communications fail, both the Source Node 305A and the Target Node 310A either roll back all changes associated with the commit or complete all changes associated, depending on the state of the process. For example, if a node crashes after the prepare is done and the response is sent, but before the commit phase, the nodes may complete the commit after coming online. This requires additional communications, however, to determine the state of each node and ensure that the nodes are still in sync. If the nodes rolled back, they may attempt to perform the commit again at a later time. In contrast, using the streamlined commit process, in some failure modes, one or both of the Source Node 305B and the Target Node 310B can commit and/or retain the committed changes, because the gathered tracking data can be used to resync with the other node when communication is established.

Figure 4:
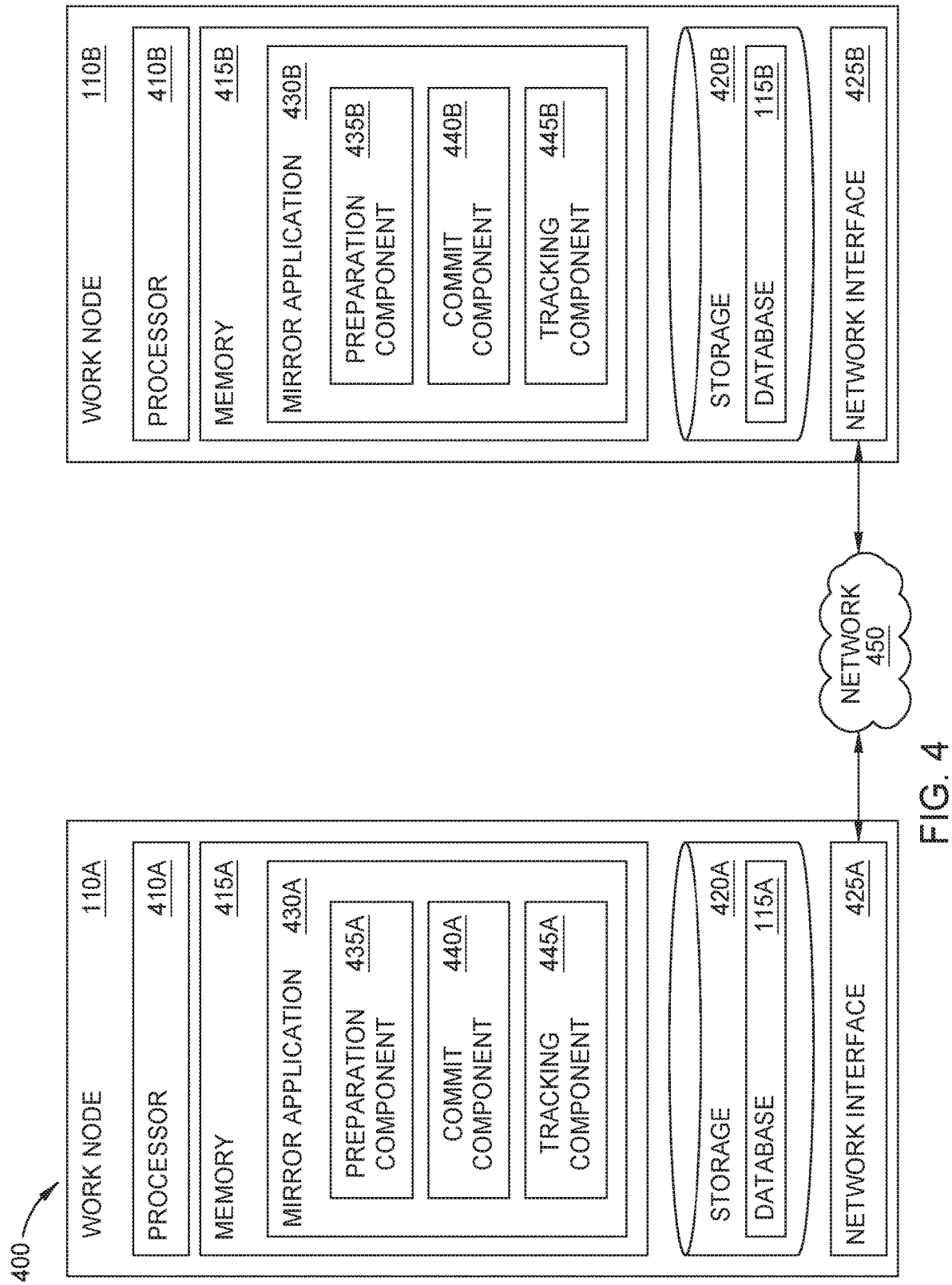
FIG. 4 is a block diagram illustrating worker nodes configured to synchronized changes using a streamlined commit procedure, according to one embodiment disclosed herein.

FIG. 4 is a block diagram illustrating Worker Nodes 110A-B configured to synchronized changes using a streamlined commit procedure, according to one embodiment disclosed herein. In the illustrated embodiment, each Worker Node 110A and 110B includes a respective Processor 410A-B, Memory 415A-B, Storage 420A-B, and a respective Network Interface 425A-B. In the illustrated embodiment, each Processor 410A-B retrieves and executes programming instructions stored in the respective Memory 415A-B, as well as stores and retrieves application data residing in the respective Storage 420A-B. The Processors 410A-B are each representative of a single CPU, multiple CPUs, a single CPU having multiple processing cores, and the like. The Memory 415A-B is generally included to be representative of a random access memory. Storage 420A-B may be disk drives or flash-based storage devices, and may include fixed and/or removable storage devices, such as fixed disk drives, removable memory cards, or optical storage, network attached storage (NAS), or storage area network (SAN). Via the Network Interfaces 425A-B, the Work Nodes 110A-B can be communicatively coupled with each other, as well as with one or more other devices and components, including other Work Nodes 110, Monitor Nodes 105, and the like.

Although depicted as physical devices in the illustrated embodiment, in embodiments, the Work Nodes 110A-B may be implemented using hardware, software, or a combination of hardware and software. As illustrated, the Storage 420A-B of each Work Node 110A-B includes a respective Database 115A-B, to which the corresponding Work Node 110A-B commits data. That is, when the Work Node 110A commits changes to storage, it does so by modifying its local Database 115A. Similarly, when the Work Node 110B commits changes, it does so to its local Database 115B. Further, as illustrated, the Memory 415A-B of each Work Node 110A-B includes a respective Mirror Application 430A-B. Although depicted as software residing in respective Memories 415A-B, in embodiments, the operations of the Mirror Applications 430A-B can be implemented using hardware, software, or a combination of hardware and software.

As illustrated, each Mirror Application 430A-B includes a respective Preparation Component 435A-B, a respective Commit Component 440A-B, and a respective Tracking Component 445A-B. Although depicted as discrete components for clarity, in embodiments, the operations and functionality of the Preparation Components 435A-B, Commit Components 440A-B, and Tracking Components 445A-B can be combined or divided across any number of components. In the illustrated embodiment, the Work Nodes 110A-B are communicatively linked via a Network 450. In embodiments, this Network 450 may be wired, wireless, or a combination of wired and wireless connections. Further, the Network 450 can include any communications link, including a local network, the Internet, or any other connection. Although two Work Nodes 110A-B are depicted, in embodiments, there may of course be any number of nodes in a given deployment.

In an embodiment, each Preparation Component 435 performs commit validation for its corresponding Work Node 110. In one embodiment, this validation includes confirming that the changes can be committed to the corresponding Database 115 (e.g., by confirming it will not result in duplicate or conflicting keys), and ensuring other constraints are maintained. Further, in an embodiment, the Commit Component 440 of each node completes the commit process updating the corresponding Database 115 and releasing any secured locks covering the relevant data. In some embodiments, the Tracking Component 445 of each node is responsible for tracking transactions and operations occurring on the corresponding node. In an embodiment, as operations are performed and transactions are processed, the Tracking Component 445 monitors the changes such that they can be re-implemented in the future, if needed. In one embodiment, if one of the Work Nodes 110 fails during a commit process, the Tracking Component 445 of the remaining node can begin (or retain) this tracking data, and complete the commit. The failed node can then use this tracking data to resync the changes, when communication is reestablished.

In some embodiments, the Tracking Component 445 of each Work Node 110 is responsible for tracking changes on that particular node. Notably, in one embodiment, only one system will be undergoing tracking at any given time. If communications are down but both nodes are still running, in one embodiment, the secondary system will be in "blocked" state, which prevents any changes until communications are re-established (and the tracked changes from the primary have been resynchronized). In some embodiments, tracking is only performed when mirroring is suspended (e.g., because one system is down, communications are down, and/or the user has suspended mirroring). During active mirroring, however, the Tracking Component 445 is dormant in some embodiments.

Figure 5:
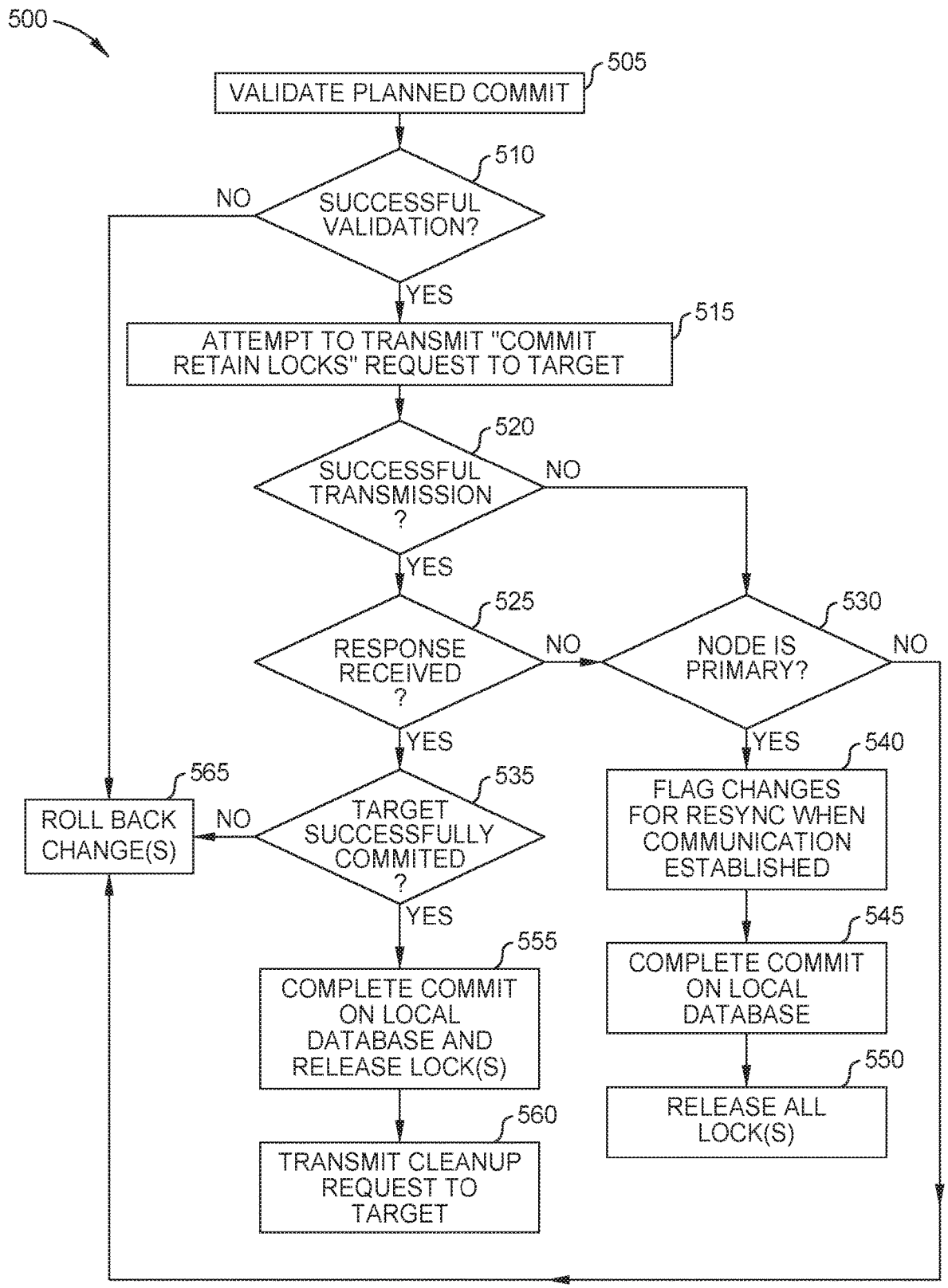
FIG. 5 is a flow diagram illustrating a method for streamlined commits from the perspective of a source node, according to one embodiment disclosed herein.

FIG. 5 is a flow diagram illustrating a method 500 for streamlined commits from the perspective of a source node, according to one embodiment disclosed herein. The method 500 begins at block 505, where the source node validates the planned commit. This can include, for example, enforcing referential integrity, checking for duplicate/conflicting keys in the local database, and the like. The method 500 then proceeds to block 510, where the source node determines whether the commit was successfully validated. If not, the method 500 continues to block 565, where the source node rolls back all changes associated with the commit. Note that, at this stage, nothing has been transmitted to the target node. In an embodiment, the target node therefore does nothing. In another embodiment, if communications are available to the target node, the source node instructs the target node to roll back the changes as well (e.g., roll back the operations in memory).

Returning to block 510, if the commit is validated, the method 500 proceeds to block 515, where the source node transmits (or attempts to transmit) a "commit retain locks" request to the target node. In an embodiment, as discussed above, this request instructs the target node to complete both the preparation stage and the actual commit, without awaiting further transmissions. Further, in the illustrated embodiment, upon completing the commit, the target node retains the locks relating to the commit. This is in contrast to the traditional two-phase process, where the target node first prepares to commit, and then awaits further instruction. Only upon receiving this instruction does the target complete the commit. Returning to FIG. 5, after the source node attempts to transmit the request, the method 500 continues to block 520.

At block 520, the source node determines whether this transmission was successful. In one embodiment, the monitor node can inform the source node that communications are down between the work nodes. In such an embodiment, the source node can therefore determine whether the transmission succeeded, based on whether or not the communications link between the nodes is live. In another embodiment, the source node can wait a predefined period of time. If no response is received, the source node can infer that communications are offline between the nodes (or the other target node has failed). Further, in some embodiments, if communications are down, the attempted transmission (or the attempt to receive a transmission) will fail immediately (e.g., the node need not wait to determine that communication is down). If the source node determines that the transmission was unsuccessful, the method 500 proceeds to block 530, where the source node determines whether it is a primary node or secondary node.

In one embodiment, the monitor node and/or users can define each node as either primary or secondary. In embodiments, how a node responds to failure of the other node or of communications between the nodes depends in part on whether the node is primary or secondary. As depicted in the illustrated embodiment, if the source node is a secondary node (e.g., the target node was or is the primary node), the method 500 proceeds to block 565, where the source node rolls back all of the planned changes. The source node can, in some embodiments, attempt to re-commit the changes once communications are reestablished.

In one embodiment, if the primary node fails, the monitor node or a user may convert the secondary node to a primary node. Returning to block 530, if the source node is the primary node or is made the primary node, the method 500 continues to block 540. At block 540, the source node enables tracking (or begins tracking) of the changes, and flags all of the pending changes to be resynced when communications are reestablished. In one embodiment, when communication to the target node is reestablished, the source node identifies all flagged changes and transmits the corresponding tracking data to the target node. The target node can then implement the changes based on the tracking data, in order to synchronize the nodes.

At block 545, the source node completes the commit on its local database by implementing all of the indicated changes. The method 500 then continues to block 550, where the source node releases all locks involved in the update. The source node can then continue to operate normally. In this way, the source node can proceed to finalize and commit its pending changes, and continue to process new transactions, while the target node recovers from the failure (or while the communications are reestablished). Thus, embodiments of the present disclosure enable one node to commit changes and proceed with ordinary operations, even while the other fails to commit (or rolls back) the changes.

Returning to block 520, if the source node determines that the transmission was successful, the method 500 continues to block 525 where the source node awaits a response. At block 525, the source node determines whether a response from the target node has been received. In one embodiment, this includes waiting a predefined period of time, and determining that a response is not forthcoming if the period has passed. In some embodiments, the monitor node may inform the source node that no response is coming (e.g., because the target node is offline, or because communications have failed). If no response has been received (or the source node determines or infers that no response will be received), the method 500 continues to block 530, discussed in more detail above.

If, at block 525, the source node receives a response from the target node, the method 500 proceeds to block 535, where the source node determines, based on this response, whether the target node successfully completed the commit. In an embodiment, if the target node did not complete the commit, the preparation failed due to some internal contradiction or other failure of the validation process. In the illustrated embodiment, the method 500 therefore continues to block 565, where the source node rolls back all of the changes. In some embodiments, a user may be required to intervene and remedy this issue.

If the target completed the commit, however, the method 500 proceeds to block 555, where the source node completes the commit process on its local database, and releases all of the locks it acquired to perform the commit. The method 500 then continues to at block 560, where the source node transmits a cleanup request to the target node. In response to this request, in one embodiment, the target node releases any locks it retained to perform the commit.

Figure 6:
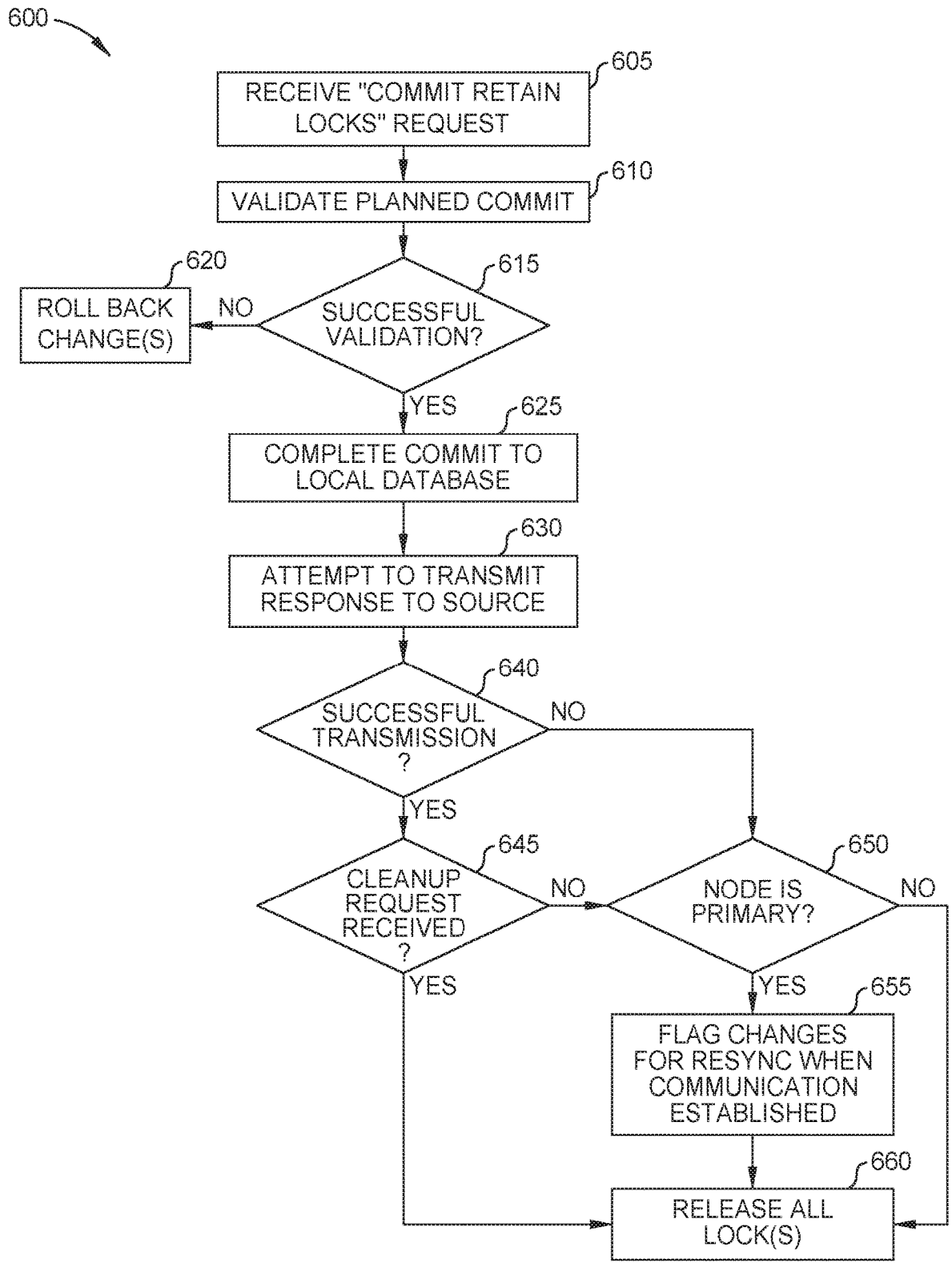
FIG. 6 is a flow diagram illustrating a method for streamlined commits from the perspective of a target node, according to one embodiment disclosed herein.

FIG. 6 is a flow diagram illustrating a method 600 for streamlined commits from the perspective of a target node, according to one embodiment disclosed herein. In the illustrated embodiment, the method 600 begins at block 605, where the target node receives a request from the source node, instructing it to perform the streamlined procedures by preparing for the commit, and proceeding to complete the commit (if the preparation is successful). In an embodiment, the request further instructs the target node to retain any locks related to the commit. The method 600 then continues to block 610, where the target node validates the commit, as discussed above. At block 615, the target node determines whether this validation was successful. If not, the method 600 proceeds to block 620, where it rolls back the changes. In some embodiments, the target node also transmits a response to the source node, indicating that the preparation and/or commit failed. In one embodiment, the source node similarly rolls back the changes, as discussed above.

Returning to block 615, if the validation was successful, the method 600 proceeds to block 625, where the target node completes the commit on the local database. At block 630, the target node then attempts to transmit an indication of this success to the source node. The method 600 then proceeds to block 640, where the target node determines whether this response was successfully transmitted. In one embodiment, the target node can determine whether the transmission was successful using similar techniques to the source node. In one embodiment, this includes sending the response, and waiting for a predefined period of time to pass. In another embodiment, the monitor node can inform the target node that the communications link is not available.

If the target node determines that the transmission was not successful, the method 600 proceeds to block 650, where the target node determines whether it is the primary or secondary node. If the target node is the primary node, the method 600 continues to block 655, where the target node flags the (committed) changes for resync when communications are reestablished. In this way, when the source node and target node can communicate again, the source node can use this tracking data to synchronize with the target node. The method 600 then proceeds to block 660, where the target node releases the locks it acquired to perform the commit. The target node can then continue to operate normally.

Returning to block 650, if the target node is the secondary node, the method 600 continues directly to block 660, where the target node releases its locks. Notably, in an embodiment, the target node does not flag changes for resync if it is not the primary node. Instead, the source node will use its own tracking data (from prior to the failure, such as when it transmitted the original request) in order to synchronize with the secondary node.

Turning back to block 640, if the target node determines that the transmission was successful, the method 600 proceeds to block 645, where the target node determines whether a cleanup request has been received from the source node. If so, the method 600 proceeds to block 660, where the target node performs the cleanup by releasing all locks it acquired for the commit, as discussed above. If, however, no cleanup request is received (e.g., within a predefined period) or the target node determines that no cleanup request is forthcoming (e.g., because the monitor node informs the target node that the communications or the source node are offline), the method 600 proceeds to block 650, discussed in more detail above.

Figure 7:
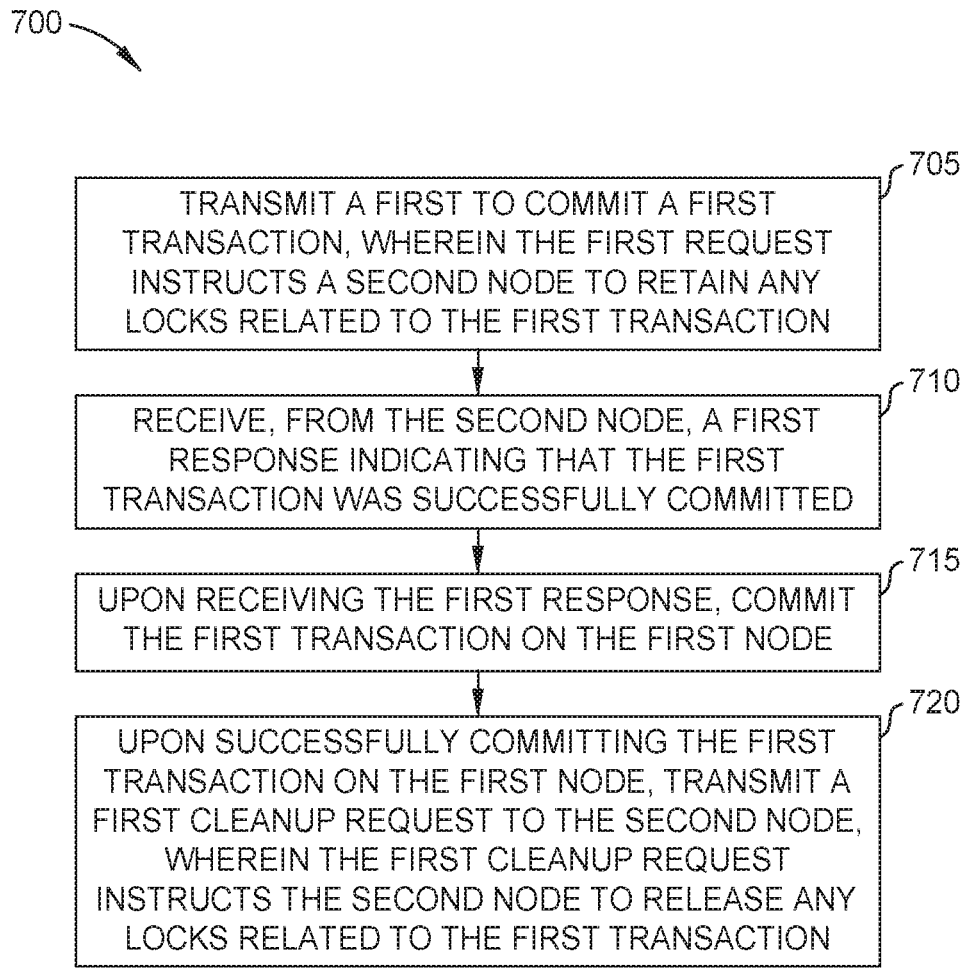
FIG. 7 is a flow diagram illustrating a method for streamlined commits between synchronized nodes, according to one embodiment disclosed herein.

FIG. 7 is a flow diagram illustrating a method 700 for streamlined commits between synchronized nodes, according to one embodiment disclosed herein. The method 700 begins at block 705, where a first node transmits a first request to commit a first transaction, wherein the first request instructs a second node to retain any locks related to the first transaction. At block 710, the first node receives, from the second node, a first response indicating that the first transaction was successfully committed. The method 700 then continues to block 715 where, upon receiving the first response, the first node commits the first transaction on the first node. The method 700 then proceeds to block 720, where, upon successfully committing the first transaction on the first node, the first node transmits a first cleanup request to the second node, wherein the first cleanup request instructs the second node to release any locks related to the first transaction.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a Mirror Application 430) or related data available in the cloud. For example, the Work Node(s) 110 could execute on a computing system in the cloud and process workloads and transactions. In such a case, the nodes could perform streamlined synchronization procedures and store data at a storage location in the cloud Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
initiating a streamlined commit procedure between a first node and a second node by transmitting, from the first node to the second node, a first request to commit a first transaction, wherein the first request further instructs the second node to retain any locks related to the first transaction, and wherein the first transaction involves only record-level changes in a database;
receiving, at the first node, from the second node, a first response indicating that the first transaction was successfully committed;
upon receiving the first response, committing the first transaction on the first node; and
upon successfully committing the first transaction on the first node, transmitting a first cleanup request to the second node, wherein the first cleanup request instructs the second node to release any locks related to the first transaction.

2. The method of claim 1, wherein the first node transmits the first request instructing the second node to retain the locks related to the first transaction based on determining that the first transaction includes only record-level changes, the method further comprising:
upon determining that a second transaction involves more than record-level changes, transmitting, from the first node, a second request to prepare to commit the second transaction, wherein, responsive to the second request, the second node prepares to commit the second transaction but does not commit the second transaction until receiving a commit instruction from the first node.

3. The method of claim 1, the method further comprising:
transmitting, from the first node, a second request to commit a second transaction, wherein the second request instructs the second node to retain any locks related to the second transaction;
upon failing to receive a response from the second node, determining, by the first node, whether the first node is a primary node or a secondary node; and
upon determining that the first node is a primary node:
flagging the second transaction for resync when communication is established with the second node; and
committing the second transaction on the first node.

4. The method of claim 1, the method further comprising:
transmitting, from the first node, a second request to commit a second transaction, wherein the second request instructs the second node to retain any locks related to the second transaction;
upon failing to receive a response from the second node, determining, by the first node, whether the first node is a primary node or a secondary node; and
upon determining that the first node is a secondary node:
rolling back the second transaction on the first node.

5. The method of claim 1, the method further comprising:
transmitting, from the first node, a second request to commit a second transaction, wherein the second request instructs the second node to retain any locks related to the second transaction;
receiving, from the second node, a second response indicating that the second transaction was not successfully committed; and
rolling back the second transaction on the first node.

6. The method of claim 1, the method further comprising:
receiving, by the first node, from the second node, a second request to commit a second transaction, wherein the second request instructs the first node to retain any locks related to the second transaction;
committing the second transaction on the first node;
transmitting, to the second node, a second response indicating that the second transaction was successfully committed; and
upon receiving a second cleanup request from the second node, releasing any locks related to the second transaction.

7. The method of claim 1, the method further comprising:
receiving, by the first node, from the second node, a second request to commit a second transaction, wherein the second request instructs the first node to retain any locks related to the second transaction;
committing the second transaction on the first node;
transmitting, to the second node, a second response indicating that the second transaction was successfully committed; and
upon failing to receive a response from the first node, determining, by the first node, whether the first node is a primary node or a secondary node; and
upon determining that the first node is a primary node:
flagging the second transaction for resync when communication is established with the second node.

8. The method of claim 1, the method further comprising:
receiving, by the first node, from the second node, a second request to commit a second transaction, wherein the second request instructs the first node to retain any locks related to the second transaction;
committing the second transaction on the first node;
transmitting, to the second node, a second response indicating that the second transaction was successfully committed; and
upon failing to receive a response from the first node, determining, by the first node, whether the first node is a primary node or a secondary node; and
upon determining that the first node is a secondary node:
releasing the locks related to the second transaction.

9. A non-transitory computer-readable storage medium having computer-readable program code embodied therewith, the computer-readable program code executable by one or more computer processors to perform an operation comprising:
initiating a streamlined commit procedure between a first node and a second node by transmitting, from the first node to the second node, a first request to commit a first transaction, wherein the first request further instructs the second node to retain any locks related to the first transaction, and wherein the first transaction involves only record-level changes in a database;
receiving, at the first node, from the second node, a first response indicating that the first transaction was successfully committed;
upon receiving the first response, committing the first transaction on the first node; and
upon successfully committing the first transaction on the first node, transmitting a first cleanup request to the second node, wherein the first cleanup request instructs the second node to release any locks related to the first transaction.

10. The non-transitory computer-readable storage medium of claim 9, the operation further comprising:
- transmitting, from the first node, a second request to commit a second transaction, wherein the second request instructs the second node to retain any locks related to the second transaction;
- upon failing to receive a response from the second node, determining, by the first node, whether the first node is a primary node or a secondary node; and
- upon determining that the first node is a primary node:
- flagging the second transaction for resync when communication is established with the second node; and
- committing the second transaction on the first node.

11. The non-transitory computer-readable storage medium of claim 9, the operation further comprising:
- transmitting, from the first node, a second request to commit a second transaction, wherein the second request instructs the second node to retain any locks related to the second transaction;
- upon failing to receive a response from the second node, determining, by the first node, whether the first node is a primary node or a secondary node; and
- upon determining that the first node is a secondary node:
- rolling back the second transaction on the first node.

12. The non-transitory computer-readable storage medium of claim 9, the operation further comprising:
- receiving, by the first node, from the second node, a second request to commit a second transaction, wherein the second request instructs the first node to retain any locks related to the second transaction;
- committing the second transaction on the first node;
- transmitting, to the second node, a second response indicating that the second transaction was successfully committed; and
- upon receiving a second cleanup request from the second node, releasing any locks related to the second transaction.

13. The non-transitory computer-readable storage medium of claim 9, the operation further comprising:
- receiving, by the first node, from the second node, a second request to commit a second transaction, wherein the second request instructs the first node to retain any locks related to the second transaction;
- committing the second transaction on the first node;
- transmitting, to the second node, a second response indicating that the second transaction was successfully committed; and
- upon failing to receive a response from the first node, determining, by the first node, whether the first node is a primary node or a secondary node; and
- upon determining that the first node is a primary node:
- flagging the second transaction for resync when communication is established with the second node.

14. The non-transitory computer-readable storage medium of claim 9, the operation further comprising:
- receiving, by the first node, from the second node, a second request to commit a second transaction, wherein the second request instructs the first node to retain any locks related to the second transaction;
- committing the second transaction on the first node;
- transmitting, to the second node, a second response indicating that the second transaction was successfully committed; and
- upon failing to receive a response from the first node, determining, by the first node, whether the first node is a primary node or a secondary node; and
- upon determining that the first node is a secondary node:
- releasing the locks related to the second transaction.

15. A system comprising:
- one or more computer processors; and
- a memory containing a program which when executed by the one or more computer processors performs an operation comprising:
- initiating a streamlined commit procedure between a first node and a second node by transmitting, from the first node to the second node, a first request to commit a first transaction, wherein the first request further instructs the second node to retain any locks related to the first transaction, and wherein the first transaction involves only record-level changes in a database;
- receiving, at the first node, from the second node, a first response indicating that the first transaction was successfully committed;
- upon receiving the first response, committing the first transaction on the first node; and
- upon successfully committing the first transaction on the first node, transmitting a first cleanup request to the second node, wherein the first cleanup request instructs the second node to release any locks related to the first transaction.

16. The system of claim 15, the operation further comprising:
- transmitting, from the first node, a second request to commit a second transaction, wherein the second request instructs the second node to retain any locks related to the second transaction;
- upon failing to receive a response from the second node, determining, by the first node, whether the first node is a primary node or a secondary node; and
- upon determining that the first node is a primary node:
- flagging the second transaction for resync when communication is established with the second node; and
- committing the second transaction on the first node.

17. The system of claim 15, the operation further comprising:
- transmitting, from the first node, a second request to commit a second transaction, wherein the second request instructs the second node to retain any locks related to the second transaction;
- upon failing to receive a response from the second node, determining, by the first node, whether the first node is a primary node or a secondary node; and
- upon determining that the first node is a secondary node:
- rolling back the second transaction on the first node.

18. The system of claim 15, the operation further comprising:
- receiving, by the first node, from the second node, a second request to commit a second transaction, wherein the second request instructs the first node to retain any locks related to the second transaction;
- committing the second transaction on the first node;
- transmitting, to the second node, a second response indicating that the second transaction was successfully committed; and
- upon receiving a second cleanup request from the second node, releasing any locks related to the second transaction.

19. The system of claim 15, the operation further comprising:
- receiving, by the first node, from the second node, a second request to commit a second transaction, wherein the second request instructs the first node to retain any locks related to the second transaction;

committing the second transaction on the first node;

transmitting, to the second node, a second response indicating that the second transaction was successfully committed; and upon failing to receive a response from the first node, determining, by the first node, whether the first node is a primary node or a secondary node; and upon determining that the first node is a primary node:

flagging the second transaction for resync when communication is established with the second node.

20. The system of claim 15, the operation further comprising:

receiving, by the first node, from the second node, a second request to commit a second transaction, wherein the second request instructs the first node to retain any locks related to the second transaction;

committing the second transaction on the first node;

transmitting, to the second node, a second response indicating that the second transaction was successfully committed; and upon failing to receive a response from the first node, determining, by the first node, whether the first node is a primary node or a secondary node; and upon determining that the first node is a secondary node: releasing the locks related to the second transaction.

* * * * *